Figure 1:
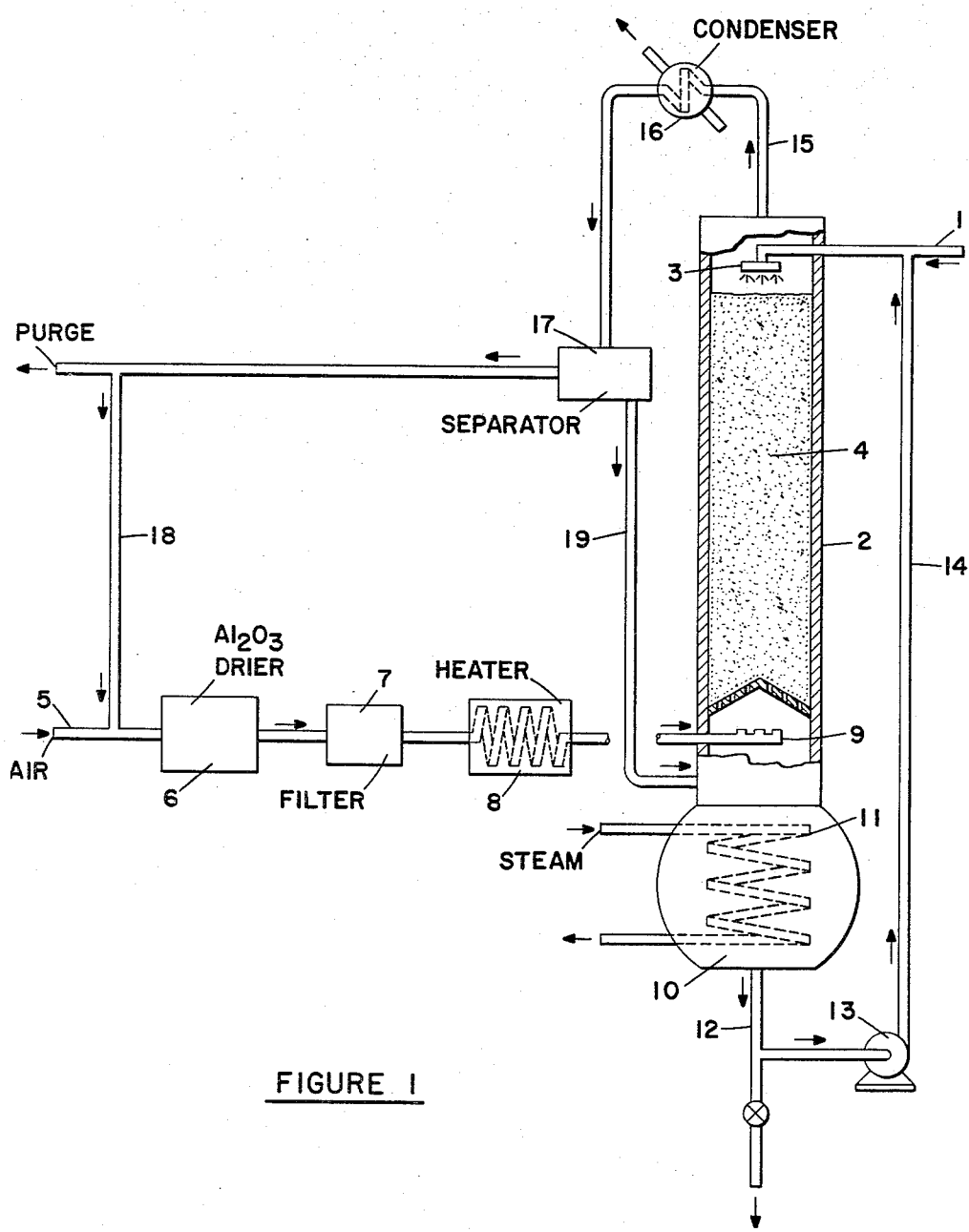

THE EFFECT OF OXYGEN CONTENT ON METHANOL TOLERANCE

Donald F. Koenecke
Ober C. Slotterbeck

2,950,333
METHOD FOR CONTROLLING THE OXIDATION OF POLYMER OILS

Donald F. Koenecke, Westfield, and Ober C. Slotterbeck, Rahway, N.J., assignors to Esso Research and Engineering Company, a corporation of Delaware Filed July 24, 1957, Ser. No. 673,974

4 Claims. (Cl. 260—669)

This invention relates to the oxidation of liquid polymeric drying oils and more particularly relates to a method of controlling the degree of oxidation when the oxidation is carried out by blowing with air or oxygen.

It is known that liquid polymeric drying oils can be oxidized by blowing with air or oxygen at a temperature of 240–260° F. in the presence of a hydrocarbon solvent, preferably an aromatic hydrocarbon, and preferably in the presence of a catalyst such as a small amount of a metal naphthenate or other drier. The oxidation can be carried out by contacting the oil with the gaseous oxidizing agent in any suitable reactor, such as a pressure autoclave, a packed vertical tower through which the oil is allowed to flow in countercurrent relation to the oxidizing agent. Alternatively the air or oxygen may be bubbled into the mixture in the liquid phase.

The viscosity and oxygen content of the product increase as the oxidation proceeds. However, the viscosity increase and oxygen content are not related in any set pattern. Therefore, the amount of oxygen in the polymer oil at any given time cannot be determined from the viscosity. Furthermore, the oxygen content cannot be determined from the gain in weight because volatile by-products such as water and formic acid are formed which together with the solvent are continually removed from the system. It follows that it is very difficult if not impossible to know the extent of oxidation at any given moment.

In accordance with the present invention, it has now been discovered that the extent of oxidation can be easily followed by periodic sampling of the polymer oil and determining its tolerance to alcohols.

The hydrocarbon drying oils which are suitable for oxidizing in accordance with this invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e.g., with 0 to 40% of styrene, styrenes having alkyl groups substituted on the ring such as para methyl styrene, dimethyl styrene or diethyl styrene, acrylonitrile, methacrylonitrile, methyl acrylate, methyl methacrylate and the like. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150° and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content (N.V.M.). The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 to Arundale et al. which describes alternative monomers, catalysts, reaction diluents, polymerization modifiers, suitable ranges of proportions of the various ingredients, suitable ranges of polymerization conditions, etc., the teachings of which are incorporated herein.

SYNTHESIS METHOD B

An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of glacial acetic acid, sulfuric acid or other anhydrous organic acid or by filtering through clay or the like. The colorless product is then fractionally distilled to remove hydrocarbon diluent and modifiers such as dioxane until a product containing about 50–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as diethyl ether, methyl ethyl ether, dibutyl ether, or phenetole; or the modifier may be omitted altogether, especially when it is not essential to obtain a perfectly colorless product. Similarly, isopropanol is not necessary, though aliphatic alcohols of 1–6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60° and 200° C., e.g., butane, benzene, xylene, naphtha, cyclohexane, Solvesso 150 (an aromatic fraction boiling 185°–213° C. and having a Kauri Butanol value of 100), and Solvesso 100 (an aromatic fraction boiling 157°–177° C. and having a Kauri Butanol value of 93.3), and the like. The diluents are usually used in amounts ranging from 50 to 500 parts per 100 parts of monomer. The reaction temperature may vary between about 40° C. and 105° C., preferably around 50° to 85° C. As a catalyst, 0.1 to 10 parts of dispersed metallic sodium is used per 100 parts of monomers, sodium particle sizes below 100 microns being particularly effective.

A particularly suitable process for the preparation of the polymer oil in accordance with this synthesis is that described in U.S. Patent 2,762,851 issued September 11, 1956, to Anthony H. Gleason, or the multistage continuous process described and claimed in Serial No. 485,392 filed February 1, 1955, in the name of Stanley E. Jaros et al. The disclosures of these applications are incorporated herein by reference.

The polymers produced by the above process have molecular weights up to 10,000 and viscosities up to 22 poises at 50% N.V.M. and are pale yellow to colorless liquids.

As pointed out above it is difficult to determine the extent of the oxidation of the oil at any given time during the oxidation. Since it is often desirable to stop the oxidation at a predetermined oxygen content in the polymer, it becomes desirable to know when this amount of oxygen has been introduced into the polymer. In accordance with the invention a sample of the oxidized polymer is removed from the reaction vessel, diluted to the desired concentration with an aromatic solvent having a Kauri Butanol value of at least 40, e.g., Solvesso 100 (K.B. value 93.3) or Solvesso 150 (K.B. value 100) and titrated with an alcohol, such as methanol, ethanol, isopropanol, or butanol at a constant non-volatile content. When the tolerance point is reached, or exceeded, the solution becomes very hazy or cloudy. Upon settling, two layers form. The volume of alcohol required to reach the cloud point is a direct measure of the oxygen content of the polymer.

The invention will be better understood from the accompanying drawing which is a schematic illustration of one means for carrying out the invention.

Referring therefore to the drawing, a liquid hydrocarbon drying oil prepared suitably in accordance with the teachings of the Gleason Patent U.S. 2,762,851 is introduced by line 1 into the top of column 2 through spray nozzle 3. Column 2 may be unpacked or it may be filled with non-adsorptive packing 4, such as Berl saddles, Raschig rings or the like. The oil flows down through the packing in column 2 in the form of thin films where it is contacted with air introduced through line 5, $Al_2O_3$ drier 6, filter 7, heater 8 and distributing plate 9. Oil leaving the column 2 collects in the kettle 10 heated by steam coil 11 and is continuously drawn off through line 12 and recycled by pump 13 and line 14 to the top of the column. Thus the charge of hydrocarbon oil is continuously circulated through the column until the desired amount of oxygen has been incorporated into the oil. The column is maintained under a pressure of about 25–150 lbs. per sq. in. gage, and at a temperature between 20° and 150° C., preferably betwen 100° and 130° C. The rate of recycle through line 14 is maintained at between 15 and 35 gal./ per minute per sq. ft. of tower cross-sectional area.

Vaporized solvent and air are removed from the column through line 15. The solvent is condensed by cooler 16 and collected in separator 17 from which air is removed through line 18 and returned to air line 5 or vented. The condensed solvent may be returned to the column through line 19.

The nature of the oxidized diolefin polymer of this invention depends largely upon the extent to which the oxidation is carried. The degree or extent of oxidation in turn depends on various factors including time of oxidation, temperature, presence or absence of catalysts, type of solvent, etc. In general greater extent of oxidation results in less solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is soluble in aromatic solvents indicating that the oxidation has proceeded to a high degree.

In accordance with the discoveries of the present invention the amount of oxygen which has been incorporated into the polymer at any given time can be determined by periodically sampling, as for example, a portion of the polymer oil being recycled through line 14 and determining the tolerance of the oxidized polymer to a $C_1$ to $C_4$ alcohol, as by titration.

Further advantages of the invention will be evident from a consideration of the following experimental data which are given for the sake of illustration but without intention of limiting the invention thereto.

*Example I*

A butadiene-styrene drying oil was prepared from the following charge:

|  | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent powder, 33–37 Kauri-Butanol value (reference scale: Benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.2 poise at 50% N.V.M. in Varsol solution and the non-volatile portion thereof had an average molecular weight of about 3,000.

The polymer oil thus obtained was dissolved in Solvesso 100 and blown with oxygen. Periodically, as the oxidation continued, two samples of the oxidized polymer were removed, diluted to 35% N.V.M. and titrated with methanol and isopropanol respectively. The amount of alcohol necessary to produce turbidity was recorded and the oxygen content of the sample determined by quantitative analysis. The following data were obtained:

*TABLE I*

THE ALCOHOL TOLERANCE OF OXIDIZED POLYMER OIL

| Sample | Visc. Poise [1] | | cc. of Methanol per 10 g. 35% Solution | cc. of Isopropanol per 10 g. 35% Solution | Percent Oxygen |
|---|---|---|---|---|---|
| | 35% NVM | 50% NVM | | | |
| 1 Control (unoxidized oil) | 0.22 | 1.2 | 1.0 | 5.4 | 0.25 |
| 2 | 5.0 | 41 | 2.4 | 9.7 | 5.4 |
| 3 | 0.5 | 2.6 | 2.4 | 13.0 | 5.7 |
| 4 | 0.85 | 4.4 | 3.2 | 14.3 | 6.3 |
| 5 | 0.5 | 3.25 | 3.3 | 16.1 | 7.6 |
| 6 | 0.58 | 3.8 | 3.9 | 18.3 | 8.30 |
| 7 | 0.57 | 3.70 | 4.2 | 17.5 | 8.35 |
| 8 | 0.5 | 4.0 | 5.4 | 22.5 | 9.3 |
| 9 | 1.83 | 5.0 | 4.7 | 16.5 | 9.7 |
| 10 | 0.65 | 4.2 | 5.5 | 21.2 | 10.2 |
| 11 | 1.0 | 5.0 | 8.1 | 27.0 | 11.9 |
| 12 | 2.0 | 9.3 | 9.3 | 28.0 | 12.8 |
| 13 | 1.32 | 9.8 | 8.8 | 29.1 | 13.6 |
| 14 | 1.3 | 9.0 | 15.7 | 27.8 | 14.1 |

[1] Viscosities were determined with the Gardner bubble viscometer.

Figure 2:
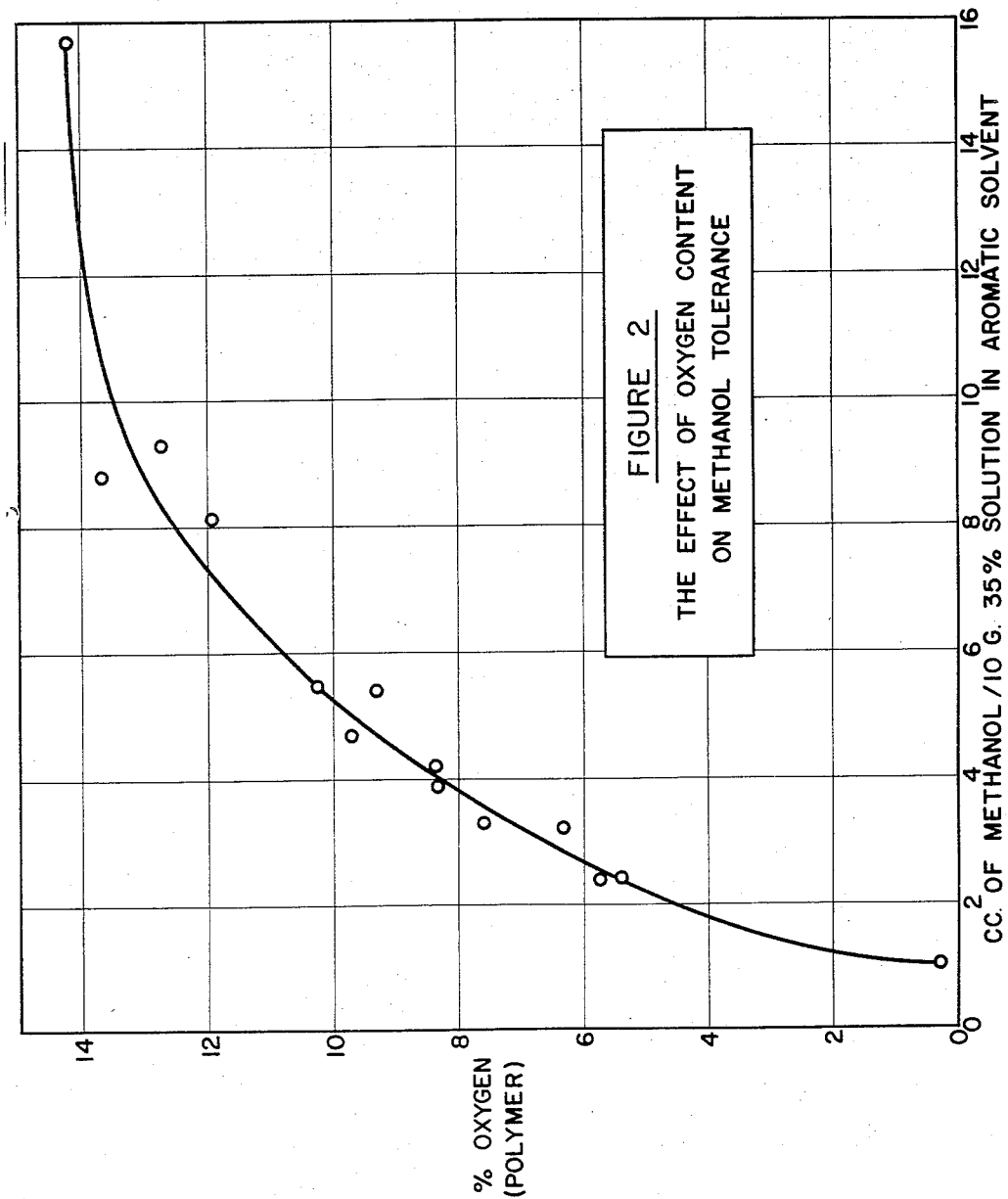

The above data show that a rapid determination of the oxygen content of a polymer oil can be made during oxidation by titrating a sample of the oxidized oil with an alcohol. When the volume of alcohol required to produce the turbidity is plotted against the oxygen content of the sample, it is clear that the volume of alcohol is directly related to the oxygen content as shown by the curve of Fig. 2. This chart thus furnishes a standard whereby the amount of oxygen in a sample can be read from the amount of alcohol necessary to produce turbulence in the sample. While Fig. 2 represents a chart for methanol, similar charts can be prepared for the other $C_1$ to $C_4$ alcohols.

The nature and objects of the present invention having been thus fully set forth and specific examples of the same given, what is claimed as new and useful and desired to be secured by Letters Patent is:

1. In a method for oxidizing a liquid polymeric hydrocarbon drying oil wherein the oil is blown with an oxygen-containing gas, the method of controlling the oxidation to incorporate a predetermined amount of oxygen in the polymeric oil which comprises periodically removing samples of the oxidized oil during oxidation, titrating the samples at a constant non-volatile content with a $C_1$ to $C_4$ alcohol until the samples become turbid, and stopping the oxidation when the amount of oxygen in the samples has reached the predetermined amount.

2. Process according to claim 1 in which the polymer oil is a liquid sodium polymer of 0–40% styrene and 60–100% butadiene.

3. Process according to claim 2 in which the alcohol is methanol.

4. Process according to claim 2 in which the alcohol is isopropanol.

References Cited in the file of this patent

UNITED STATES PATENTS

| | | |
|---|---|---|
| 2,089,017 | Burk | Aug. 3, 1937 |
| 2,406,206 | De Groote et al. | Aug. 20, 1946 |
| 2,731,454 | Edmonds | Jan. 17, 1956 |
| 2,826,618 | Gleason | Mar. 11, 1958 |